Dec. 28, 1965   F. KUHRT ET AL   3,226,631
MAGNETO-ELECTRIC TRANSMITTER OF THE PROXIMITY TYPE
Filed June 29, 1961
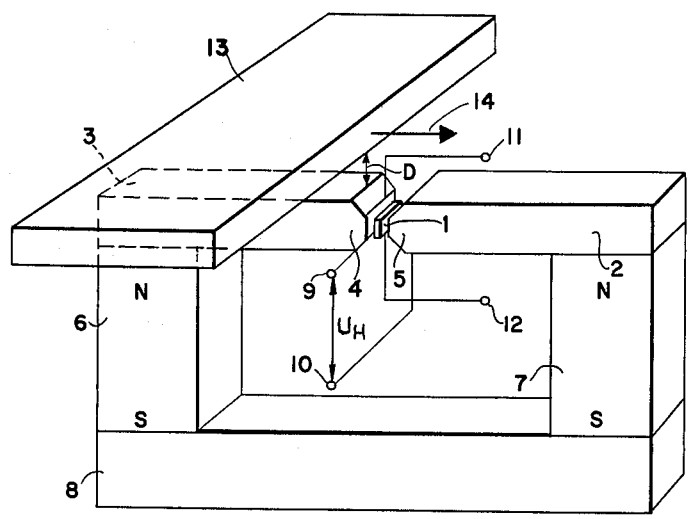
FIG.1
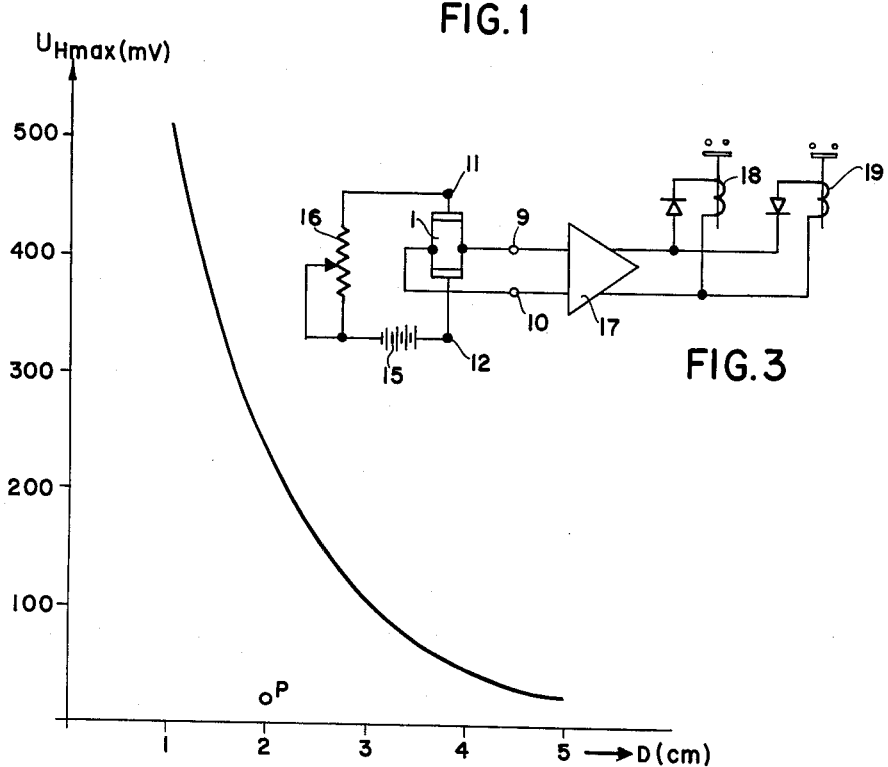
FIG.3
FIG.2

United States Patent Office 3,226,631
Patented Dec. 28, 1965

3,226,631
MAGNETO-ELECTRIC TRANSMITTER OF THE PROXIMITY TYPE
Friedrich Kuhrt and Hans-Joachim Lippmann, Nurnberg, Germany, assignors to Siemens-Schuckertwerke Aktiengesellschaft, Berlin-Siemensstadt, Germany, and at Erlangen, Germany, a corporation of Germany
Filed June 29, 1961, Ser. No. 120,781
Claims priority, application Germany, July 7, 1960, S 69,270
3 Claims. (Cl. 323—94)

Our invention relates to magneto-electric transducers and, in a more particular aspect, to a magneto-electric signal transmitter which, in response to proximity of a magnetizable body such as a traveling conveyance or other object, issues or changes a signal voltage and which for this purpose is provided with a Hall-voltage generator. Such proximity-type, position-responsive sensing and transmitting devices are known, for example, from German Patent 956,130. More specifically, in the known position-responsive devices of this kind, a magnetic field traveling with an object acts upon a semiconducting Hall plate located between magnetizable pole pieces in order to generate a Hall-voltage in response to the magnetic field. Some of these devices are equipped with two magnets that produce a stationary magnetic flux for continuously acting upon the Hall plate, so that the traveling object, acting from the outside upon the transmitting device, merely causes a disturbance of the permanent magnetic flux. Such disturbance reduces or increases the magnetic flux normally passing through the Hall plate, and in special cases may also reverse the direction of the flux. The issuance of a signal voltage comes about by relative motion between the active portion of the Hall-voltage generator and the magnetizable object such as an iron rail, iron sheet or other ferromagnetic body which, alone or together with non-magnetizable structure, approaches or passes by the transmitting device. An advantage of such a transmitter is the fact that the traveling object need not be provided with a permanent magnet. However, the known devices of this type have an extremely slight sensitivity so that the noise level is relatively high and high-gain amplification of the signal is required.

It is an object of our invention to improve such proximity-type signal transmitters and similar sensing and transducing devices of the Hall-voltage generating type toward much greater sensitivity than heretofore attained.

To this end, and in accordance with a feature of our invention we provide the core structure of the magnetically responsive sensing device or signal transmitter, in whose field gap the Hall plate is located, with two pole pieces adjacent to the respective sides of the Hall plate, and also with a plurality of permanent magnets which form a substantially closed magnetic circuit together with the pole pieces and have their respective strengths adapted to each other and so poled that the line integral of the magnetic field strength along the flux path of the substantially closed circuit is substantially or approximately equal to zero. That is, the resultant field of the magnets in the closed magnet circuit is zero or negligibly slight at the gap location of the Hall plate as long as no extraneous magnetic effect is active to disturb the normal field distribution.

Such a signal transmitting device, in comparison with the above-mentioned known devices, possesses a sensitivity of response that is considerably greater, namely of at least one higher decimal order of magnitude. For that reason, satisfactory response is achieved even if the objects to be responded to are rather small or if the objects remain relatively far away from the sensing portion of the signal transmitter.

The invention will be further described with reference to the embodiment of a proximity-type Hall-voltage generating transmitter according to the invention illustrated by way of example in the accompanying drawings, in which:

FIG. 1 shows in schematic perspective the signal transmitter and a traveling object responded to.

FIG. 2 is an explanatory graph of the obtainable maximal Hall-voltage in dependence upon the distance of the object from the signal transmitter.

FIG. 3 is a schematic electric circuit diagram of the transmitter shown in FIG. 1.

The signal transmitter shown in FIG. 1 is essentially a Hall-voltage generating device of special design. It comprises a Hall plate 1 of semiconducting material, preferably indium antimonide or indium arsenide. The Hall plate, having a thickness of approximately 20 microns for example, is located in a narrow gap between two pole pieces 2 and 3 whose gap-adjacent ends 4 and 5 taper toward the Hall plate. The plate is essentially in face-to-face contact with the respective pole faces of the pole pieces. It has rectangular shape and is provided with two current supply terminals along the respective narrow edges of the plate. Two probe electrodes (Hall electrodes) are located on the respective long edges of the plate midway between the two current terminals.

Two permanent magnets 6 and 7 of substantially the same magnetic strength have respective poles of the same magnetic polarity, in the illustrated example the South poles S joined with each other by a yoke piece 8 of magnetizable (high-permeability) material. The two other poles N of the magnets are joined with the respective pole pieces. The two permanent magnets together with the pole pieces 2, 3 and the yoke piece 8, form a substantially closed magnetic circuit. When the device is not subjected to any extraneous magnetic effect the integral value of magnetic field strength along the closed flux path is zero or sufficiently close to zero to be negligible, this being due to the series-opposed poling of the two permanent magnets. Consequently, under normal conditions, no appreciable flux acts upon the Hall plate 1 so that no voltage occurs between the two leads 9 and 10 of the two Hall electrodes. Under such normal conditions, the device being assumed to be operative, an energizing current is passed through the Hall plate 1 by connecting the current supply terminals 11 and 12 to a suitable source of current, for example, direct current of constant voltage. Thus, in FIG. 3, the Hall plate 1 is shown energized by constant current from a source 15 through an adjustable rheostat 16.

When the signal transmitter approaches an iron rail 13, or vice versa, in the direction indicated by the arrow 14, the magnetic balance in the flux path of the closed magnetic circuit is disturbed and the Hall plate 1 is then traversed by a magnetic flux. As a result, the Hall-voltage generator issues a voltage $U_H$ between the electrode leads 9 and 10. This signal voltage $U_H$ increases to a maximum value as the iron rail 13 approaches the gap area of the transmitter. The voltage passes through the zero value at the moment when the iron rail 13 is symmetrically opposite the Hall-plate gap of the device.

During further travel of the iron rail in the same direction, the signal voltage increases to a maximum of the opposite polarity and thereafter declines back to the zero value when the distance between rail and transmitter becomes correspondingly large. Consequently, the polarity of the Hall-voltage also permits determining the traveling direction of the object, whereas the zero passage of the Hall-voltage affords a precise indication of the travel position.

The maximum values of Hall-voltage increase with a decrease in distance between the travel path of the object and the signal transmitter. FIG. 2 indicates the maximum Hall voltage $U_{Hmax}$ in millivolts versus the distance D in cm. for an iron rail of a given size. Under otherwise comparable conditions, the maximum Hall voltage obtainable with the above-mentioned known transmitter is of a lower order of magnitude as exemplified by the measuring point P in FIG. 2. Such a low output voltage is particularly disadvantageous in cases where fluctuations may occur with respect to the travel-path distance from the signal transmitter.

The Hall-voltage signal issuing from the above-described transmitter can be utilized by means of any of the electric amplifying, signalling, controlling or regulating circuits known for such purposes, for example, with the aid of a transistorized trigger amplifier. In the example of a suitable control circuit shown in FIG. 3, the Hall-voltage of plate 1 is applied to a direct-current amplifier 17 which furnishes an output voltage of reversible polarity that energizes one of two polarized relays 18, 19 at a time depending upon whether the travelling object approaches the transmitter or moves away therefrom.

It will be obvious to those skilled in the art upon a study of this disclosure that, with respect to design details, a signal transmitter according to our invention can be modified in various respects, for example by the use of electromagnets instead of permanent magnets, and can be used for other purposes such as the response to data recorded on tapes, drums or other movable record carriers, without departing from the essential features of the invention and within the scope of the claims annexed hereto.

We claim:
1. A magnetically responsive signal transmitter for responding to the presence of a magnetizable material, comprising a Hall-voltage generator having a magnetic field structure with a field gap and having a Hall plate in said gap, said structure comprising two pole pieces of magnetizable material spaced from each other at areas of the same polarity to form said gap between said same polarity pole pieces and having a plurality of magnets of series-opposed polarity disposed in magnetic series connection with each other and forming together with said pole pieces a substantially closed magnetic circuit, said magnets having in totality a resultant field strength substantially equal to zero in said gap and said Hall plate, said Hall plate being positioned in the gap between said pole pieces in spaced relation with each of said pole pieces in a manner whereby the proximity of a magnetizable material creates a magnetic disturbance which causes a change in magnetic field distribution resulting in a change of the Hall-voltage generated by said signal transmitter.

2. A magneto-electric signal transmitter responsive to proximity of a magnetizable body, comprising a Hall-voltage generator having a magnetic field structure with a field gap and having a Hall plate in said gap, said structure comprising two pole pieces of magnetizable material spaced from each other at areas of the same polarity to form said gap between said same polarity pole pieces and having two magnets of series-opposed polarity which form together with said two pole pieces a substantially closed magnetic circuit, said circuit having a flux path along which the integral of the magnetic field strength is substantially equal to zero, said Hall plate being positioned in the gap between said pole pieces in spaced relation with each of said pole pieces in a manner whereby proximity of said magnetizable body to said pole pieces causes a change in magnetic field distribution resulting in a change of the Hall-voltage generated by said signal transmitter.

3. A magnetically responsive signal transmitter for responding to the presence of a magnetizable material, comprising a Hall-voltage generator having a magnetic field structure with a field gap and having a Hall plate in said gap, said structure comprising two pole pieces of magnetizable material spaced from each other at areas of the same polarity to form said gap between said same polarity pole pieces and having two permanent magnets of substantially the same strength having respective poles of the same polarity magnetically joined with said two pole pieces, a soft-magnetic yoke magnetically interconnecting the other poles of said respective two magnets and forming a magnetic circuit together with said two magnets and said two pole pieces, said magnetic circuit having normally in said gap and said Hall plate a resultant field strength substantially equal to the zero value so that the generated Hall-voltage is substantially zero, said Hall plate being positioned in the gap between said pole pieces in spaced relation with each of said pole pieces in a manner whereby proximity of a magnetizable material creates magnetic disturbance which causes a change in gap field strength and a change in the Hall-voltage generated by said signal transmitter.

References Cited by the Examiner
UNITED STATES PATENTS

| | | | |
|---|---|---|---|
| 2,752,434 | 6/1956 | Dunlap | 307—88.5 |
| 2,892,151 | 6/1959 | Bender | 324—41 |
| 2,956,209 | 10/1960 | Kuhrt et al. | 324—45 X |
| 3,060,370 | 10/1962 | Varterasian | 323—94 |
| 3,164,013 | 1/1965 | Schmal et al. | 338—32 |

LLOYD McCOLLUM, *Primary Examiner.*